(No Model.)
G. RICE.
CONDUIT FOR CABLE RAILWAYS.
No. 304,859. Patented Sept. 9, 1884.
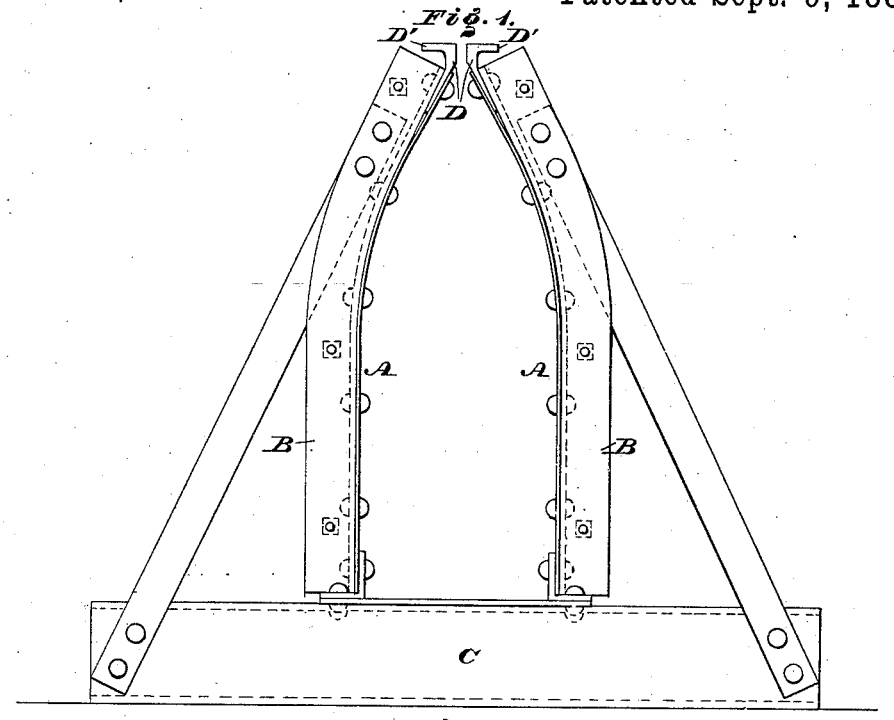
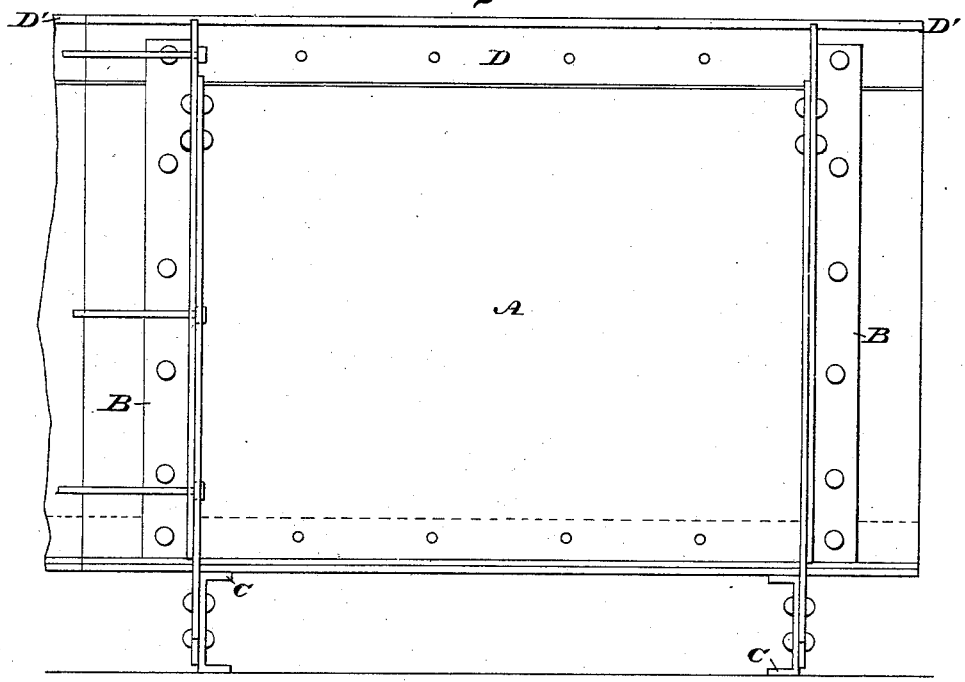
WITNESSES:
L. Douville
W. F. Kirchen
INVENTOR:
George Rice,
BY Joan A. Diedersheim.
ATTORNEY.

UNITED STATES PATENT OFFICE.

GEORGE RICE, OF PHILADELPHIA, PENNSYLVANIA.

CONDUIT FOR CABLE RAILWAYS.

SPECIFICATION forming part of Letters Patent No. 304,859, dated September 9, 1884.

Application filed May 6, 1884. (No model.)

*To all whom it may concern:*

Be it known that I, GEORGE RICE, a citizen of the United States, residing in the city and county of Philadelphia, State of Pennsylvania, have invented a new and useful Improvement in Conduits for Cable Railways, which improvement is fully set forth in the following specification and accompanying drawings, in which—

Figure 1 is an end view of a cable railway embodying my invention. Fig. 2 is a side elevation thereof.

Similar letters of reference indicate corresponding parts in the two figures.

My invention consists in so constructing and connecting the top bars or slot-angle irons of a conduit for cable railways, whereby they are made strong and durable and retain their alignment, as will be hereinafter fully set forth.

Referring to the drawings, A represents the side plates of the section of a conduit for a cable railway, and B the ribs, and C the bottom thereof, said parts being of usual construction.

D represents the top bars or "slot-angle" irons, which are firmly connected with the side plates at the upper end thereof, between the same and the ribs B. The flanges D' of the irons D project outwardly in opposite directions from the side plates of the irons, whereby they overhang the space outside of the top of the irons.

I am aware that slot-irons with outwardly turned or projecting flanges, broadly considered, are not new, and that slot-irons with inwardly-turned flanges have been secured to the side plates and ribs of the conduit; but in my case I employ slot-irons with outwardly-turned flanges, and fit the same between the side plates and the ribs of the conduit, and bolt, rivet, or otherwise connect said irons to the side plates and ribs, so that they are firmly sustained and a strong structure is provided.

Having thus described my invention, what I claim as new, and desire to secure by Letters Patent, is—

In a conduit for a cable railway, the combination of a tube and slot-irons, said irons having outwardly-turned flanges, and fitted between the side irons and ribs of the tube and connected therewith, substantially as and for the purpose set forth.

GEORGE RICE.

Witnesses:
 JOHN A. WIEDERSHEIM,
 A. P. GRANT.